US012565411B2

(12) United States Patent
Kikutake et al.

(10) Patent No.: US 12,565,411 B2
(45) Date of Patent: Mar. 3, 2026

(54) FORKLIFT

(71) Applicant: Rapyuta Robotics Co., Ltd., Tokyo (JP)

(72) Inventors: Kou Kikutake, Tokyo (JP); Jiro Nitta, Tokyo (JP)

(73) Assignee: Rapyuta Robotics Co., Ltd., Tokyo (JP)

( * ) Notice: Subject to any disclaimer, the term of this patent is extended or adjusted under 35 U.S.C. 154(b) by 273 days.

(21) Appl. No.: 18/188,498

(22) Filed: Mar. 23, 2023

(65) Prior Publication Data

US 2024/0317555 A1 Sep. 26, 2024

(51) Int. Cl.
*B66F 9/075* (2006.01)

(52) U.S. Cl.
CPC .................................. *B66F 9/0755* (2013.01)

(58) Field of Classification Search
CPC .......... B66F 9/0755; B66F 9/24; B66F 9/075; B66F 9/07504; B66F 9/12
See application file for complete search history.

(56) References Cited

U.S. PATENT DOCUMENTS

| | | | |
|---|---|---|---|
| 5,586,620 A | 12/1996 | Dammeyer et al. | |
| 7,320,385 B2 | 1/2008 | Katae et al. | |
| 2004/0098146 A1 | 5/2004 | Katae et al. | |
| 2008/0011554 A1 | 1/2008 | Broesel et al. | |

FOREIGN PATENT DOCUMENTS

| | | | |
|---|---|---|---|
| JP | 2011195334 A | * 10/2011 | |
| KR | 20160076199 A | * 6/2016 | |
| WO | WO-9635631 A1 | * 11/1996 | ............ B66F 9/0755 |

OTHER PUBLICATIONS

International Search Report and Written Opinion mailed on Jul. 4, 2023 in the PCT Application No. PCT/JP2023/015960.

* cited by examiner

*Primary Examiner* — Saul Rodriguez
(74) *Attorney, Agent, or Firm* — Trupti P. Joshi

(57) ABSTRACT

A forklift capable of recognizing a state on a front side even when holding a pallet is provided. A forklift includes: a fork movable in a height direction; a distance sensor held by the fork to be relatively movable with respect to the fork in the height direction, the distance sensor measuring a distance to an object existing in a forward direction; and a restriction mechanism restricting a movement of the distance sensor in a downward direction of the height direction when the fork is placed within a first height range from a floor surface to a first height. The distance sensor is: placed at a storage position spaced from the floor surface when restricted by the restriction mechanism; and placed at a measurement position lower than a lower surface of a pallet held by the fork when the fork is placed within a second height range equal to or higher than the first height.

20 Claims, 10 Drawing Sheets

FORKLIFT

TECHNICAL FIELD

The present disclosure relates to a forklift.

BACKGROUND

A typical warehouse system for storing loads such as products includes, for example, a forklift as described in Japanese Patent Publication No. 2022-190544 for the purpose of transporting a load placed on a pallet. For example, some types of forklifts autonomously travel with no operator thereon.

In an autonomous forklift, for example, a laser sensor is used for detecting a position of a fork insertion opening of a pallet. The laser sensor detects a shape of the pallet by performing scanning over a predetermined range on a front side in a horizontal direction with a laser beam. The laser sensor is, however, fixed to a fork. In a case where the fork holds the pallet, the pallet becomes an obstacle, blocking the scanning of the front side with the laser beam.

The present disclosure has been made in view of the above problem, and an object of the present disclosure is to provide a forklift capable of recognizing a state on the front side even when holding a pallet.

SUMMARY

To achieve the above-described object, according to an aspect of the present disclosure, a forklift is provided, the forklift including: a fork movable in a height direction; a distance sensor held by the fork to be relatively movable with respect to the fork in the height direction, the distance sensor measuring a distance to an object existing in a forward direction; and a restriction mechanism restricting a movement of the distance sensor in a downward direction of the height direction when the fork is placed within a first height range from a floor surface to a first height, in which the distance sensor is: placed at a storage position spaced from the floor surface when restricted by the restriction mechanism; and placed at a measurement position lower than a lower surface of a pallet held by the fork when the fork is placed within a second height range equal to or higher than the first height.

In such a forklift, the restriction mechanism includes: a movable piece movable in the height direction along with the distance sensor; and a restriction piece located on a movement path of the movable piece, the restriction piece receiving the movable piece to restrict a movement of the movable piece when the fork is placed within the first height range.

A relative movement between the fork and the distance sensor is caused when the fork is within the first height range.

The relative movement is caused by at least an own weight of the distance sensor.

Such a forklift further includes a guide mechanism held by the fork, the guide mechanism guiding the movement of the distance sensor in the height direction within a preset height range.

The guide mechanism includes: a guide member held by the fork; and a guided member being guided by the guide member to be movable in the height direction within a preset height range, the guided member holding the distance sensor and the movable piece.

When the fork is placed within the second height range, the guided member and the distance sensor are placed at a lowermost position with respect to the guide member under own weights of the guided member and the distance sensor.

When the fork is placed within the second height range, a relative positional relationship between the fork and the distance sensor does not change.

The guide member includes a linear guide.

The distance sensor is configured to measure the distance to the object in the forward direction at both the storage position and the measurement position.

The restriction piece includes an elastic material.

The first height is set in accordance with a thickness of the pallet.

DESCRIPTION OF THE EMBODIMENTS

Figure 1:
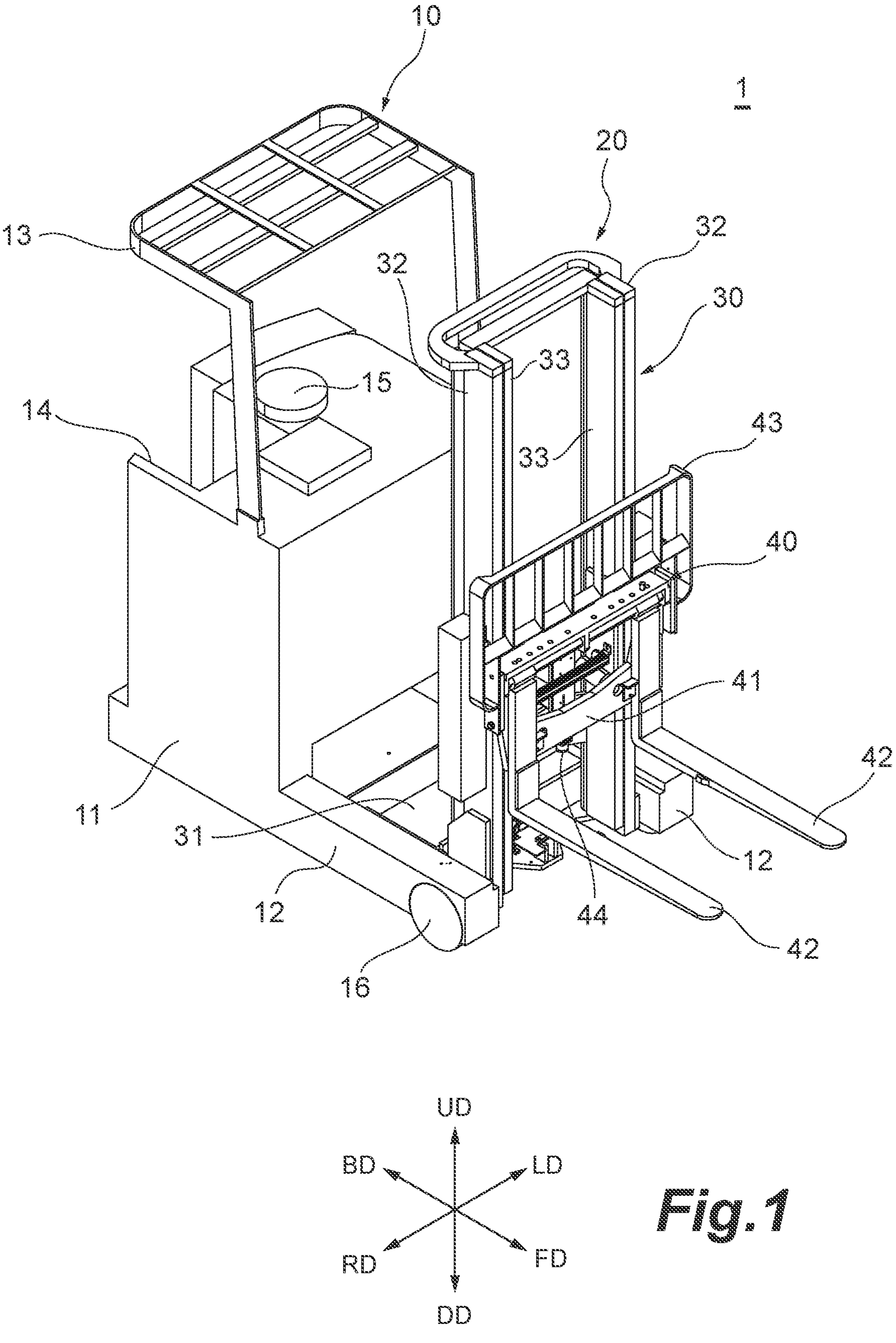
FIG. 1 is a front perspective view schematically illustrating a structure of a forklift 1 according to an embodiment of the present disclosure.

Description will be made below on an embodiment of the present disclosure with reference to the attached drawings. The same reference numerals are used for referring to the same or similar components throughout all the drawings. The following embodiment is not intended to limit the invention according to any of claims. An example of a disclosed principle and a feature will be described herein but alternatives and modifications thereof are possible without departing from the spirit and scope of the embodiment as disclosed. Further, specific features, structures, or characteristics may be combined in any appropriate manner in one or more embodiments. The following detailed description is considered merely as an example and the true scope and spirit should be defined by claims.

Figure 2:
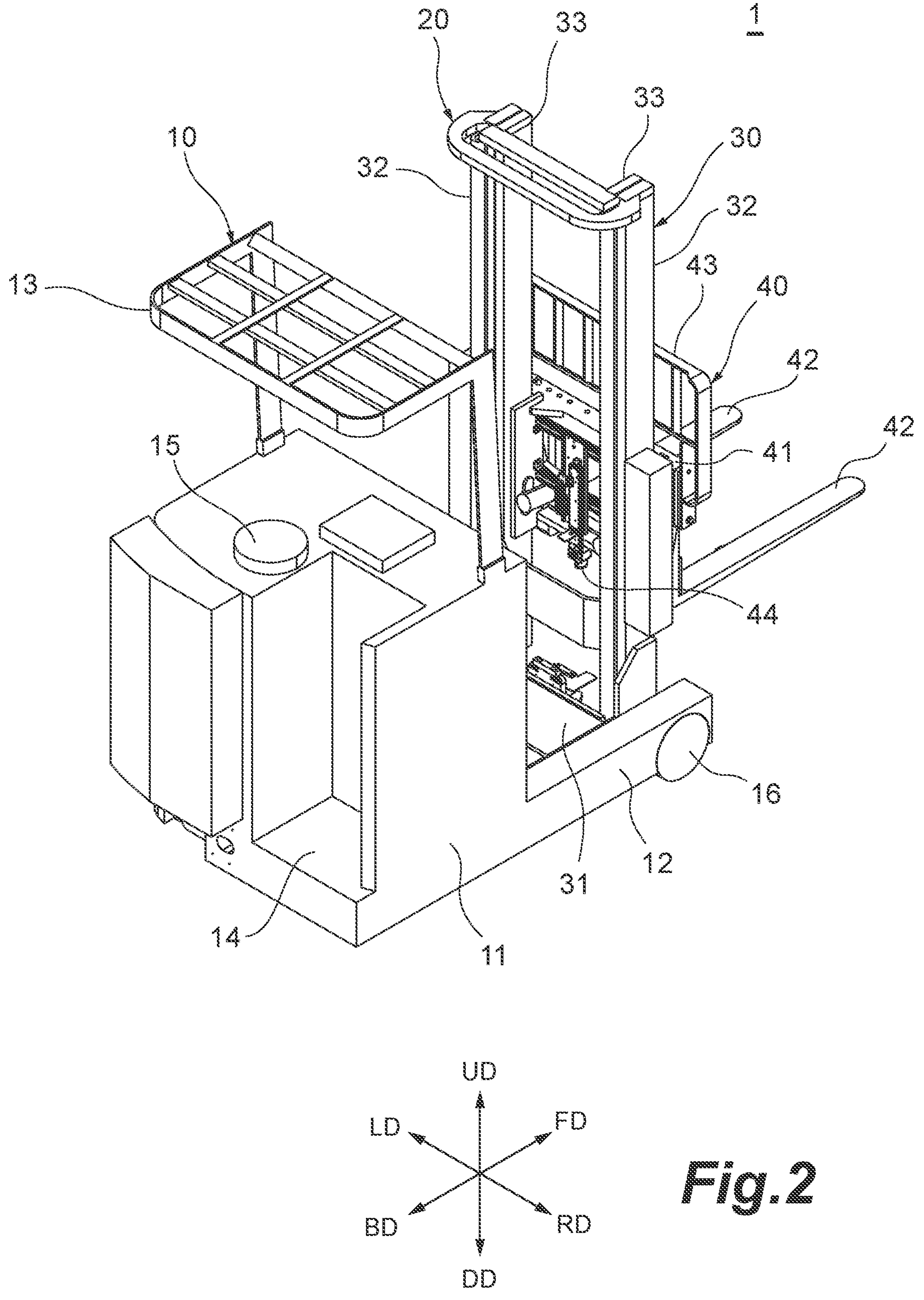
FIG. 2 is a rear perspective view schematically illustrating the structure of the forklift 1 according to the embodiment of the present disclosure.
Figure 3:
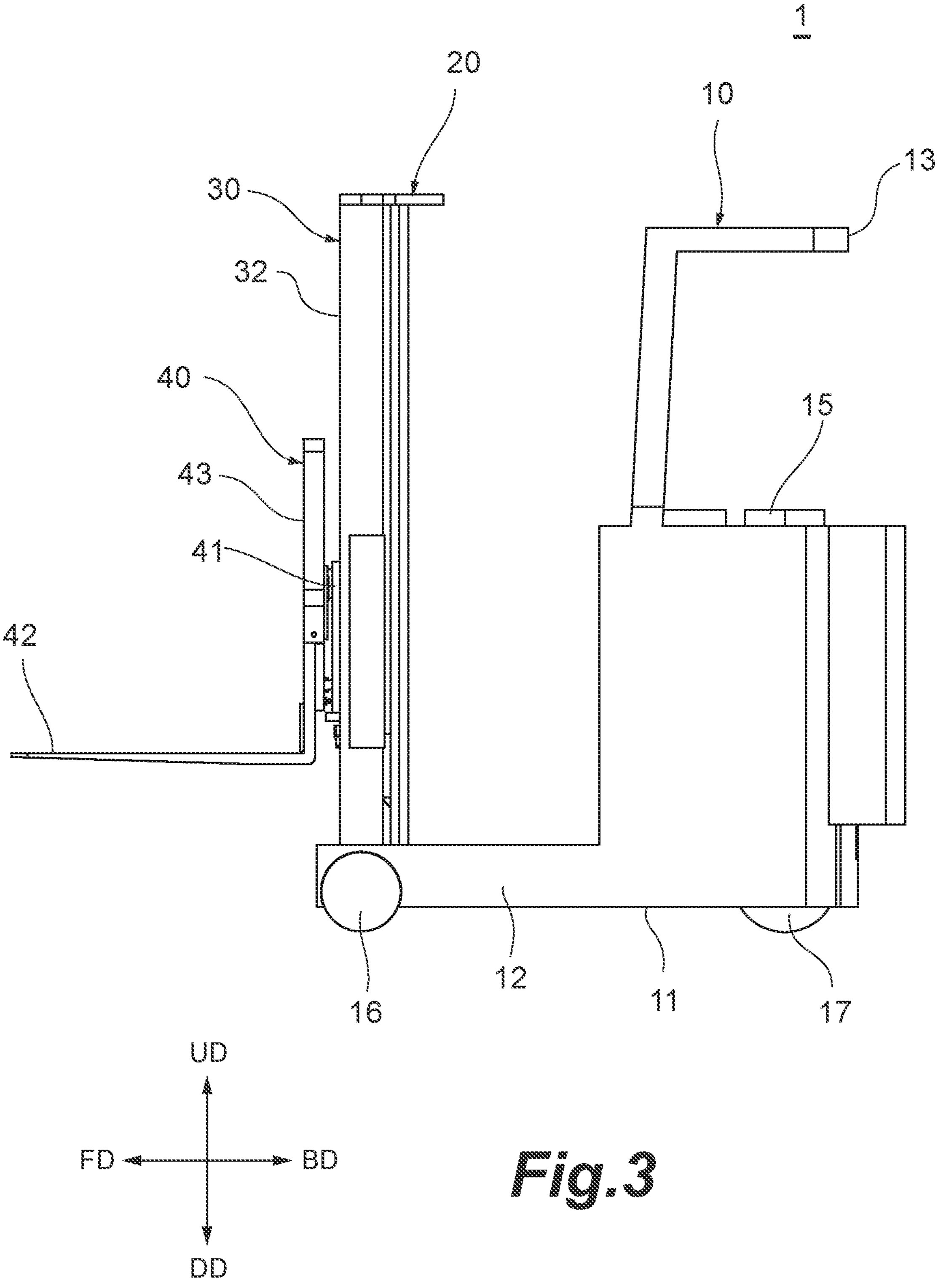
FIG. 3 is a left side view schematically illustrating the structure of the forklift 1 according to the embodiment of the present disclosure.

FIG. 1 is a front perspective view schematically illustrating a structure of a forklift 1 according to an embodiment of the present disclosure. FIG. 2 is a rear perspective view schematically illustrating the structure of the forklift 1 according to the embodiment of the present disclosure. FIG. 3 is a left side view schematically illustrating the structure of the forklift 1 according to the embodiment of the present disclosure. The forklift 1 is used in, for example, an automated storage and retrieval system (ASRS or AS/RS) to transport a load placed on a pallet to, for example, a position for loading on a truck, or the like. While being capable of traveling on the basis of an operation by an operator, the forklift 1 is also capable of autonomously traveling on the basis of recognition of an environment and a self-location within the automated storage and retrieval system.

It should be noted that regarding front-and-back directions in the drawings described below, a direction toward a front side of the forklift 1 is defined as a forward direction FD and a direction toward a rear side of the forklift 1 opposite the forward direction FD as a backward direction BD. Likewise, regarding a height direction, a direction toward an upper side of the forklift 1 is defined as an upward direction UD and a direction toward a lower side of the forklift 1 opposite the upward direction UD as a downward direction DD. Further, regarding right-and-left directions, a direction toward a left side of the forklift 1 is defined as a left direction LD and a direction toward a right side of the forklift 1 opposite the left direction LD as a right direction RD.

As illustrated in FIG. 1 to FIG. 3, the forklift 1 includes a vehicle body 10 and a loading/unloading assembly 20 located in a front end of the vehicle body 10. The vehicle body 10 includes a main body 11, a pair of straddle legs 12, 12 extending from a front end of the main body 11 in the forward direction FD in parallel with each other, and a head guard 13 attached to an upper end of the main body 11. The main body 11 includes a cab 14 for an operator to stand on in, for example, a rear end thereof and an operation unit 15 for the operator to operate the forklift 1 on an upper surface thereof. The loading/unloading assembly 20 is located between the straddle legs 12, 12. The head guard 13 prevents a load from falling toward the operator from above.

As is apparent from FIG. 3, the vehicle body 10 includes a pair of front wheels 16, 16 located in lower portions of the respective straddle legs 12, 12 and, for example, a single rear wheel 17 located in a lower portion of the main body 11. The rear wheel 17 is connected to a drive motor (not illustrated) installed in, for example, the main body 11. An electric power is supplied to the drive motor from, for example, a battery (not illustrated) also installed in the main body 11. In other words, the rear wheel 17 is a drive wheel, whereas the front wheels 16 are slave wheels. For example, the rear wheel 17 is located offset in the left direction FD with respect to a center of the forklift 1 in the right-and-left directions. Driving the rear wheel 17 enables the forklift 1 to move back and forth and right and left.

Referring back to FIG. 1 to FIG. 3, the loading/unloading assembly 20 is an assembly capable of lifting and lowering a pallet and a load is placed on the pallet. The loading/unloading assembly 20 includes a mast assembly 30 and a fork assembly 40. The mast assembly 30 is supported between the pair of straddle legs 12, 12 and is movable in the forward direction FD and the backward direction BD. The fork assembly 40 is supported on a front end of the mast assembly 30 and is movable in the upward direction UD and the downward direction DD. It should be noted that the mast assembly 30 is placed at a most advanced position in the forward direction FD in FIG. 1 to FIG. 3. The fork assembly 40 is placed at a position reached as moving in the upward direction UD from a lowermost position.

The mast assembly 30 includes a base 31 located between the pair of straddle legs 12, 12, a pair of outer masts 32, 32 standing upright in the upward direction UD from the base 31, and a pair of inner masts 33, 33 located on internal sides of the pair of respective outer masts 32, 32 facing the left direction LD and the right direction RD. The outer masts 32, 32 are formed integrally with, for example, a front end of the base 31. The outer masts 32, 32 are spaced from each other at a predetermined distance in the right-and-left directions. The base 31, the outer masts 32, 32, and the inner masts 33, 33 are supported between the pair of straddle legs 12, 12 and are movable in the forward direction FD and the backward direction BD.

The inner masts 33, 33 stand upright in the height direction adjacently to the internal sides of the respective outer masts 32, 32 facing the right-and-left directions. The inner masts 33, 33 are supported by the outer masts 32, 32 in a manner to be relatively movable in the height direction with respect to the outer masts 32, 32. The fork assembly 40 is supported by the inner masts 33, 33 in a manner to be relatively movable in the height direction with respect to the inner masts 33, 33. It should be noted that the fork assembly 40 is supported by the outer masts 32 via the inner masts 33, 33 and is thus movable in the forward direction FD and the backward direction BD along with the base 31, the outer masts 32, and the inner masts 33.

The fork assembly 40 includes a bracket 41, a pair of forks 42, 42, a backrest 43, and a distance sensor 44. The bracket 41 is supported by the inner masts 33, 33 and is relatively movable in the height direction with respect to the inner masts 33, 33. The pair of forks 42, 42 are attached to a front surface of the bracket 41. The pair of forks 42, 42 each extend in the forward direction FD from the bracket 41 at, for example, a position where one of the outer masts 32 and one of the inner masts 33 are located in the right-and-left directions. The backrest 43 is attached to, for example, an upper end of the bracket 41. The backrest 43 prevents a load on the pallet lifted by the forks 42 from falling behind the fork assembly 40.

The distance sensor 44 is attached to a rear surface of the bracket 41. In the present embodiment, the distance sensor 44 is located at, for example, a center of the forklift 1 in the right-and-left directions. In addition, the distance sensor 44 is movable in the height direction along with the bracket 41, or the fork assembly 40. For example, a 2D LiDAR sensor is used as such a distance sensor 44 and the 2D LiDAR sensor is capable of measurement of a distance to an object placed in the forward direction FD with respect to the forklift 1. As is well known, regarding the measurement of a distance, a laser beam is applied in a horizontal direction over a predetermined angular range in the forward direction FD to measure a distance to an object for each angle. The distance sensor 44 is capable of detecting the distance to the object and a shape thereof on the basis of information regarding the distance for each angle.

Figure 4:
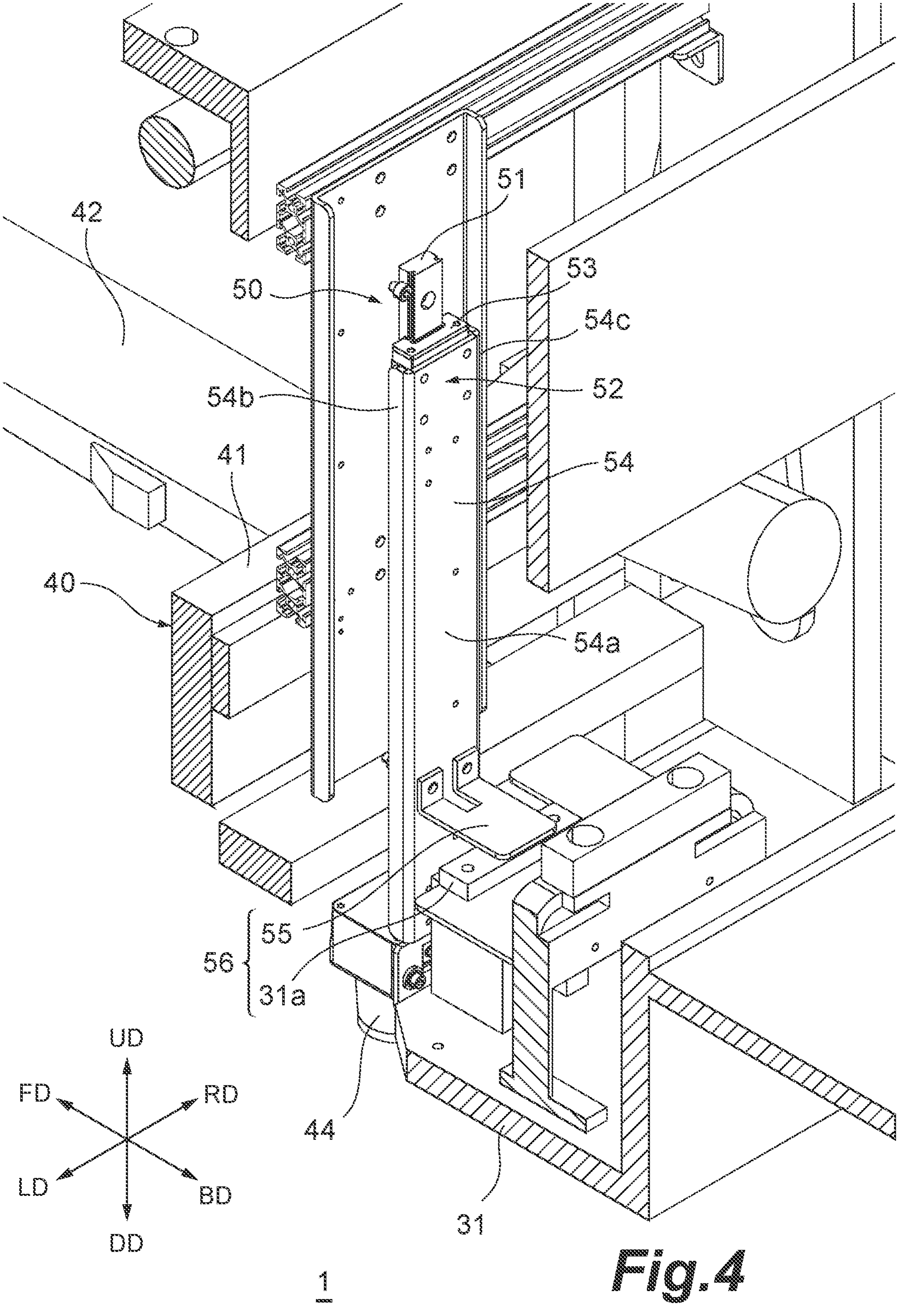
FIG. 4 is a partially cutaway enlarged perspective view schematically illustrating the structure of the forklift 1 according to the embodiment of the present disclosure.

FIG. 4 is a partially cutaway enlarged perspective view schematically illustrating the structure of the forklift 1 according to the embodiment of the present disclosure. Specifically, FIG. 4 is a perspective view as viewed from a rear surface side of the fork assembly 40 with the forklift 1 being cut along an imaginary plane orthogonal to a floor surface and that extends in the front-and-back directions. As illustrated in FIG. 4, a guide mechanism 50 is fixed to the rear surface of the bracket 41 and the guide mechanism 50 guides a movement of the distance sensor 44 in the height direction. The guide mechanism 50 includes a guide member 51 held by the bracket 41 (i.e., the forks 42) and a guided member 52 that is to be guided in a relatively movable manner by the guide member 51.

The guide member 51 is, for example, a prism-shaped guide rail and the guide rail is fixed to the rear surface of the bracket 41 and extends to be elongated in the height direction. Meanwhile, the guided member 52 includes a carriage 53 and a holding member 54, the carriage 53 being slidably supported by the guide member 51, the holding member 54 being attached to the carriage 53 and holding the distance sensor 44. A rolling bearing (not illustrated) is interposed between the guide member 51 and the carriage 53 and a movement of the carriage 53 is guided by the guide member 51 by virtue of workings of the rolling bearing. In other words, the guide member 51 and the carriage 53 serve as a so-called linear guide. A movement range of the carriage 53 on the guide member 51 is restricted within a preset height range as described later.

The holding member 54 is a member extending over a predetermined length in the height direction. In this example, the holding member 54 includes, for example, a plate 54*a* extending in a form of a flat plate in the height direction and a pair of side walls 54*b*, 54*c* bent from opposite edges of the plate 54*a* toward the forward direction FD, the opposite edges facing the left direction LD and the right direction RD and extending in the height direction. An internal surface of the plate 54*a* faces the forward direction FD with respect to the forklift 1, whereas an external surface of the plate 54*a* faces the backward direction BD with respect to the forklift 1. The carriage 53 is fixed to the internal surface of the plate 54*a* adjacently to an upper end of the holding member 54. Meanwhile, the distance sensor 44 is fixed to a lower end of the holding member 54.

The distance sensor 44 is located on a forward direction FD side with respect to the plate 54*a* of the holding member 54 in a plan view of the forklift 1. Meanwhile, a movable piece 55 is fixed on the external surface of the plate 54*a* in the backward direction BD with respect to the plate 54*a* of the holding member 54. The movable piece 55 projects in the backward direction BD from the external surface of the plate 54*a* at a predetermined height position. In this example, the movable piece 55 is located offset toward a lower end with respect to an upper end of the plate 54*a*. The movable piece 55 is a plate-shaped member extending along an imaginary plane parallel with the floor surface. Incidentally, the movable piece 55 may be formed in, for example, a block shape, provided that it projects from the plate 54*a*. The movable piece 55 is movable in the height direction with a movement of the bracket 41 or the carriage 53 and the holding member 54 in the height direction.

Meanwhile, the base 31 of the mast assembly 30 is provided with a restriction piece 31*a* and the restriction piece 31 is located on a movement path of the movable piece 55. In this example, the restriction piece 31*a* is formed in, for example, a block shape defining an upper surface extending along an imaginary plane parallel with the floor surface. The restriction piece 31*a* can receive a lower surface of the movable piece 55 on the upper surface thereof. Since the base 31 of the mast assembly 30 is not movable in the height direction, the movable piece 55 relatively moves in the height direction with respect to the restriction piece 31*a* with the movement of the bracket 41 or the carriage 53 and the holding member 54 in the height direction. Meanwhile, since the bracket 41 and the mast assembly 30 move in the front-and-back directions in an integrated manner, no relative movement in the front-and-back directions is established between the movable piece 55 and the restriction piece 31*a*. It should be noted that the movable piece 55 and the restriction piece 31*a* serve as a restriction mechanism 56 of the present disclosure.

Figure 5:
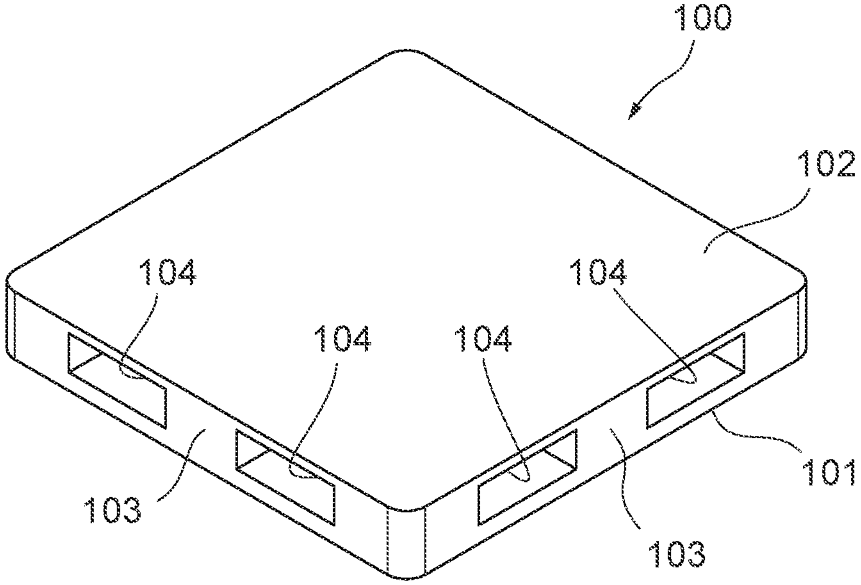
FIG. 5 is a perspective view schematically illustrating a structure of a pallet 100 according to a specific example.

FIG. 5 is a perspective view schematically illustrating a structure of a pallet 100 according to a specific example. The pallet 100 includes a lower board 101, an upper board 102 extending, for example, in parallel with the lower board 101, and a plurality of support members 103 located between the lower board 101 and the upper board 102. The lower board 101 and the upper board 102 each have, for example, a square outline in a plan view. In this example, nine of the support members 103 in total are located at four corners of the lower board 101 and the upper board 102, intermediate positions between adjacent ones of the corners, and an intermediate position on a diagonal line of the lower board 101. Thus, each of four side surfaces of the pallet 100 is provided with two insertion openings 104 for insertion of the forks 42 between adjacent ones of the support members 103. It should be noted that the pallet 100 includes, for example, wood, resin material, or metal material.

In the forklift 1 according to the present embodiment, a distance to and a shape of a target are to be detected by the distance sensor 44 and data regarding the shape, size, and the like of the target is registered in advance in a storage (not illustrated). Specifically, the data regarding the shape, size, and the like of the target includes shapes and sizes of the pallet 100 and the insertion openings 104 thereof, a map for identifying a range where the forklift 1 is movable, a shape, size, and the like of equipment (for example, a shelf of a rack or a transport conveyor) where the pallet 100 is placed on the map. A controller (not illustrated) for the forklift 1 can accurately know a distance to an object and a shape thereof on the basis of comparison and collation of the above-described data registered in advance with data regarding a shape of the object acquired by the distance sensor 44.

Figure 6:
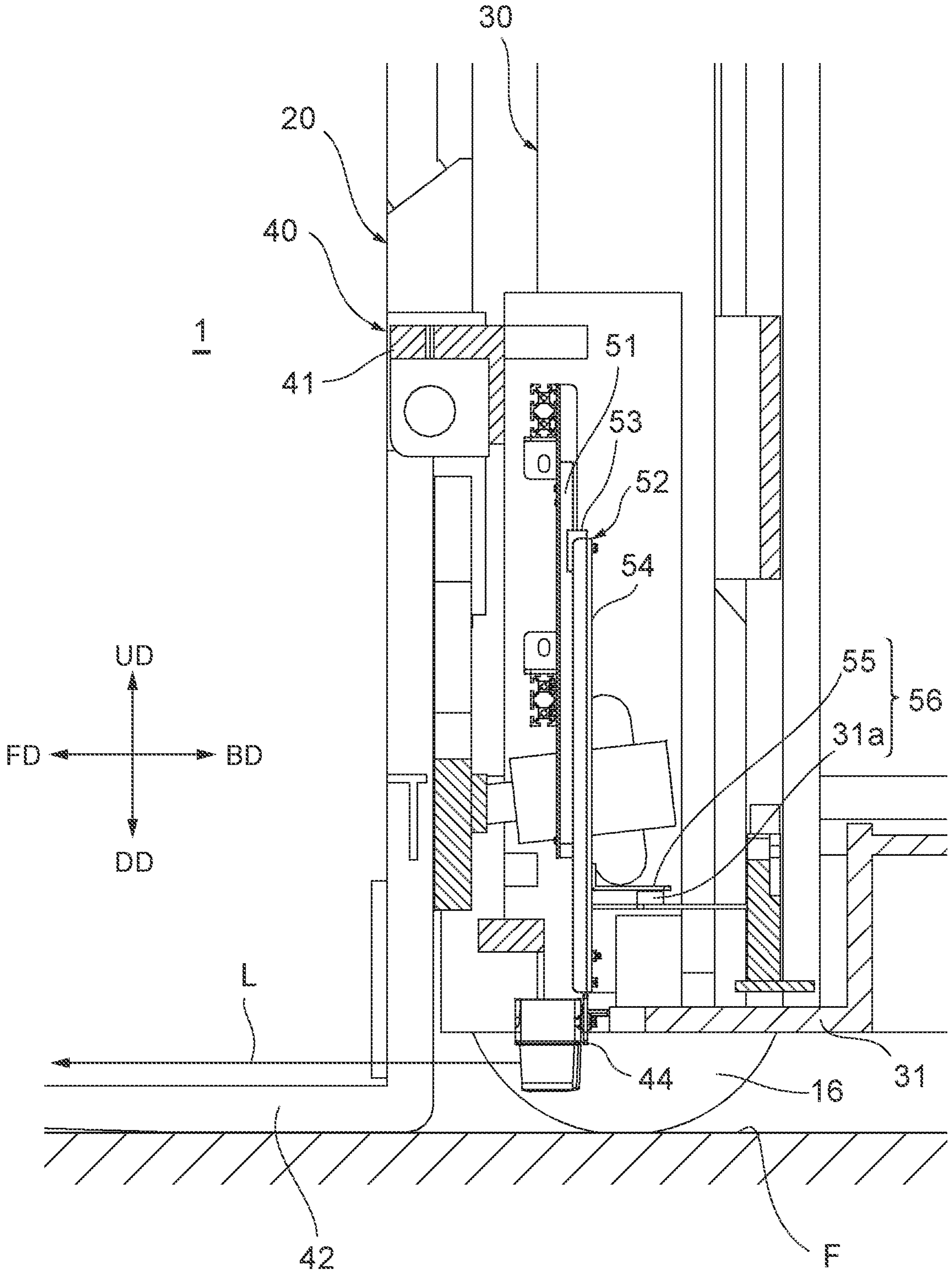
FIG. 6 is a partially cutaway side view of the forklift 1, illustrating a state where a fork 42 is placed on a floor surface F.

Next, description will be made on a variation in a relative position of the distance sensor 44 relative to the forks 42 in the height direction. FIG. 6 is a partially cutaway side view of the forklift 1, illustrating a state where the forks 42 are placed on a floor surface F. As illustrated in FIG. 6, when lower surfaces of the forks 42 are placed on the floor surface F, or when the fork assembly 40 is placed at the lowermost position in the height direction, the movable piece 55 is received on the upper surface of the restriction piece 31*a*. In other words, a movement of the movable piece 55 toward the downward direction DD is restricted. A movement of the holding member 54 with the movable piece 55 attached, i.e., the distance sensor 44, toward the downward direction DD is restricted. The distance sensor 44 is thus placed at a storage position. At this time, the guided member 52 (the carriage 53 and the holding member 54) is placed at an uppermost position with respect to the guide member 51 as illustrated in FIG. 4.

At the storage position, the distance sensor 44 is placed at a position spaced from the floor surface F. In this example, the distance sensor 44 is placed, for example, at a height in a range from 30 to 40 mm, approximately, from the floor surface F. As is apparent from FIG. 6, a laser beam L of the distance sensor 44 is defined at a position in the upward direction UD above upper surfaces of the forks 42. The laser beam L is placed, for example, at a position of 20 mm, approximately, in the upward direction UD from the upper surfaces of the forks 42. At the storage position, the laser beam L of the distance sensor 44 is applied toward the forward direction FD from between the pair of forks 42, 42. The laser beam L is applied over a predetermined angular range (for example, a right-and-left angular range of 135 degrees around a center in the forward direction FD). A distance to an object and a shape thereof are detected by such application of the laser beam L.

An upward movement of the forks 42, or the fork assembly 40, in the upward direction UD from this state causes the guide member 51 attached to the fork assembly 40 to move upward along with fork assembly 40, while the guided member 52 and the distance sensor 44 stay at those positions under their own weights. In other words, the height from the floor surface F to the distance sensor 44 does not change. The movable piece 55 remains received by the restriction piece 13*a*. With an upward movement of the fork assembly 40, a movement of the guided member 52 in the height direction is guided by the guide member 51. With the upward movement, the forks 42 move upward to positions in the upward direction UD above the distance sensor 44. During the upward movement of the forks 42, the distance sensor 44 applies the laser beam toward the forward direction FD as described above, which makes it possible to detect an object.

Figure 7:
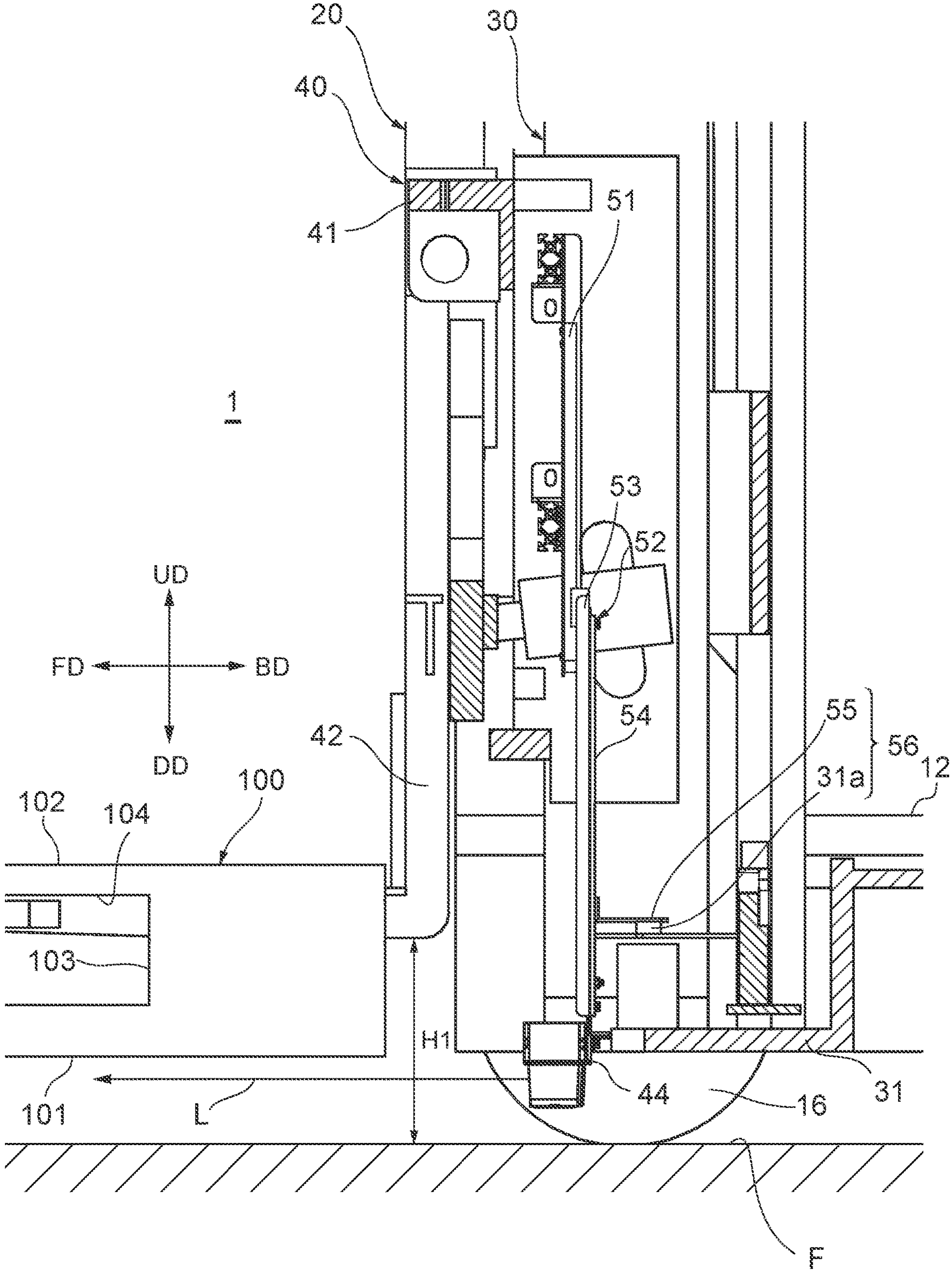
FIG. 7 is a partially cutaway side view of the forklift 1, illustrating a state where the fork 42 is placed at a first height H1 from the floor surface F.
Figure 8:
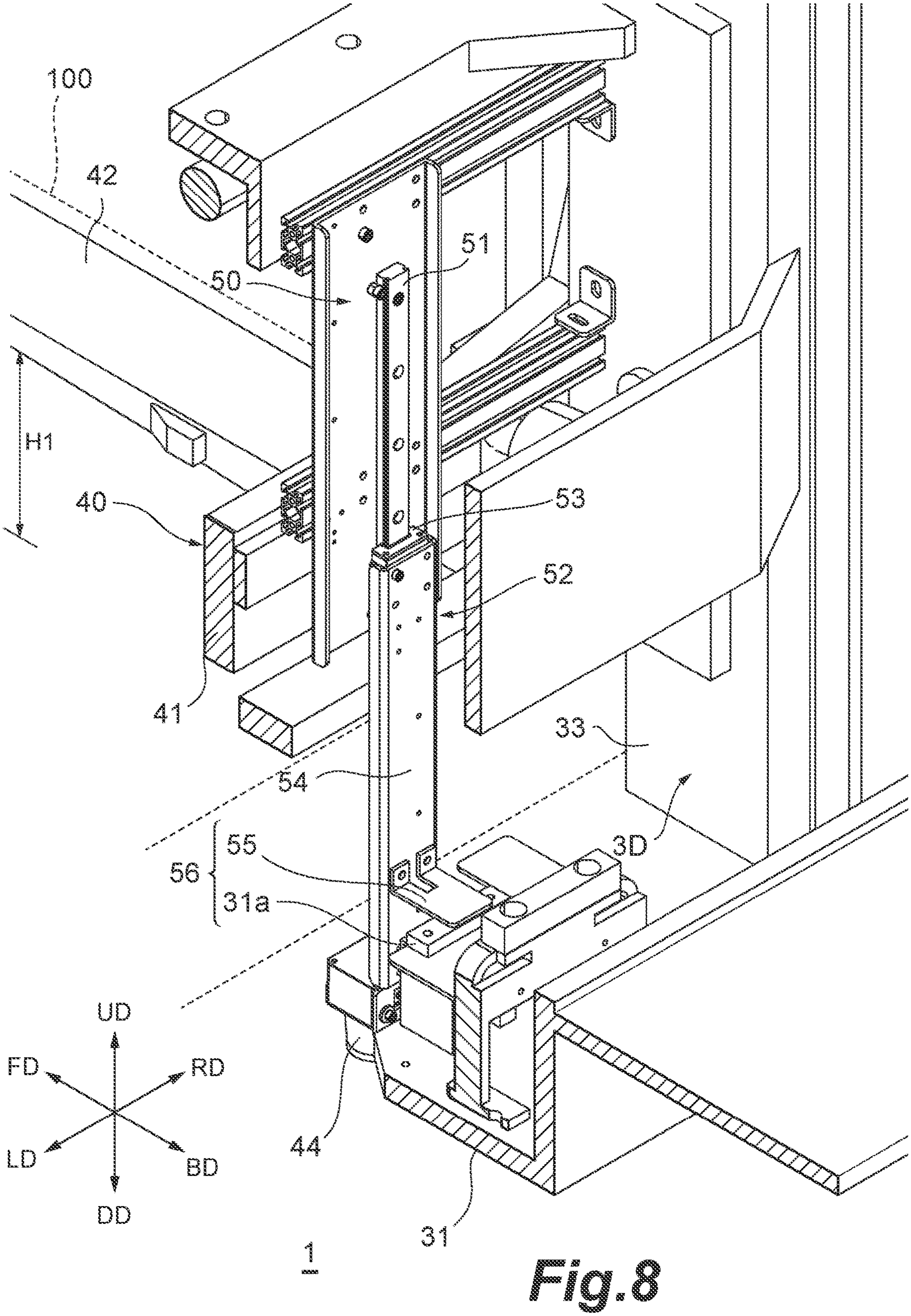
FIG. 8 is a partially cutaway enlarged perspective view of the forklift 1, illustrating a state where the fork 42 is placed at the first height H1.

FIG. 7 is a partially cutaway side view of the forklift 1, illustrating a state where the forks 42 are placed at a first height H1 from the floor surface F. FIG. 8 is a partially cutaway enlarged perspective view of the forklift 1, illustrating a state where the forks 42 are placed at the first height H1. As illustrated in FIG. 7 and FIG. 8, an upward movement of the lower surfaces of the forks 42 from the floor surface F to the first height H1 causes the guided member 52 to move to a lowermost position with respect to the guide member 51. During the movement of the guided member 52 from the uppermost position to the lowermost position, the movable piece 55 remains received on the upper surface of the restriction piece 31*a*. When the guided member 52 is placed at the lowermost position, a further relative movement of the guided member 52 relative to the guide member 51 is restricted by a restriction member (not illustrated). Thus, a range of the relative movement of the guide member 51 relative to the guided member 52 is restricted within a preset height range.

As is apparent from FIG. 7, the pallet 100 is held on the forks 42, 42. When the forks 42 reach the first height H1, the distance sensor 44 is placed at a measurement position lower than the lower surfaces of the forks 42. Specifically, the distance sensor 44 can apply the laser beam L toward the forward direction FD at the measurement position lower than the lower board 101 of the pallet 100. Specifically, the laser beam L is placed at a 20-mm position, approximately, in the downward direction DD below a lower surface of the lower board 101 of the pallet 100. This makes it possible for the distance sensor 44 to detect a distance to and a shape of an object, which may exist in the forward direction FD ahead of the forklift 1, even in a state where the forks 42, 42 hold the pallet 100 and a load placed on the pallet 100.

Figure 9:
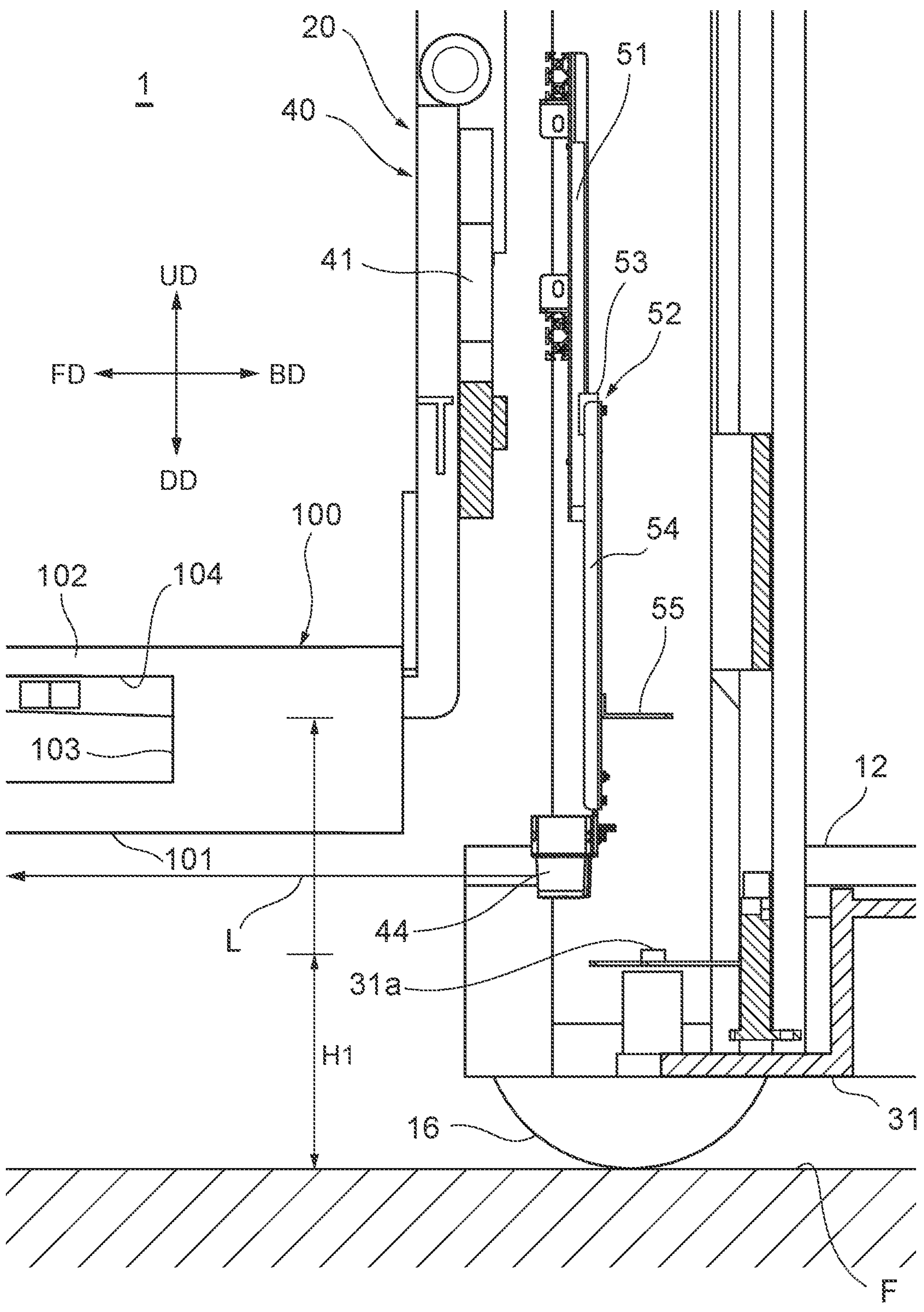
FIG. 9 is a partially cutaway side view of the forklift 1, illustrating a state where the fork 42 is placed at a height higher than the first height H1 from the floor surface F.
Figure 10:
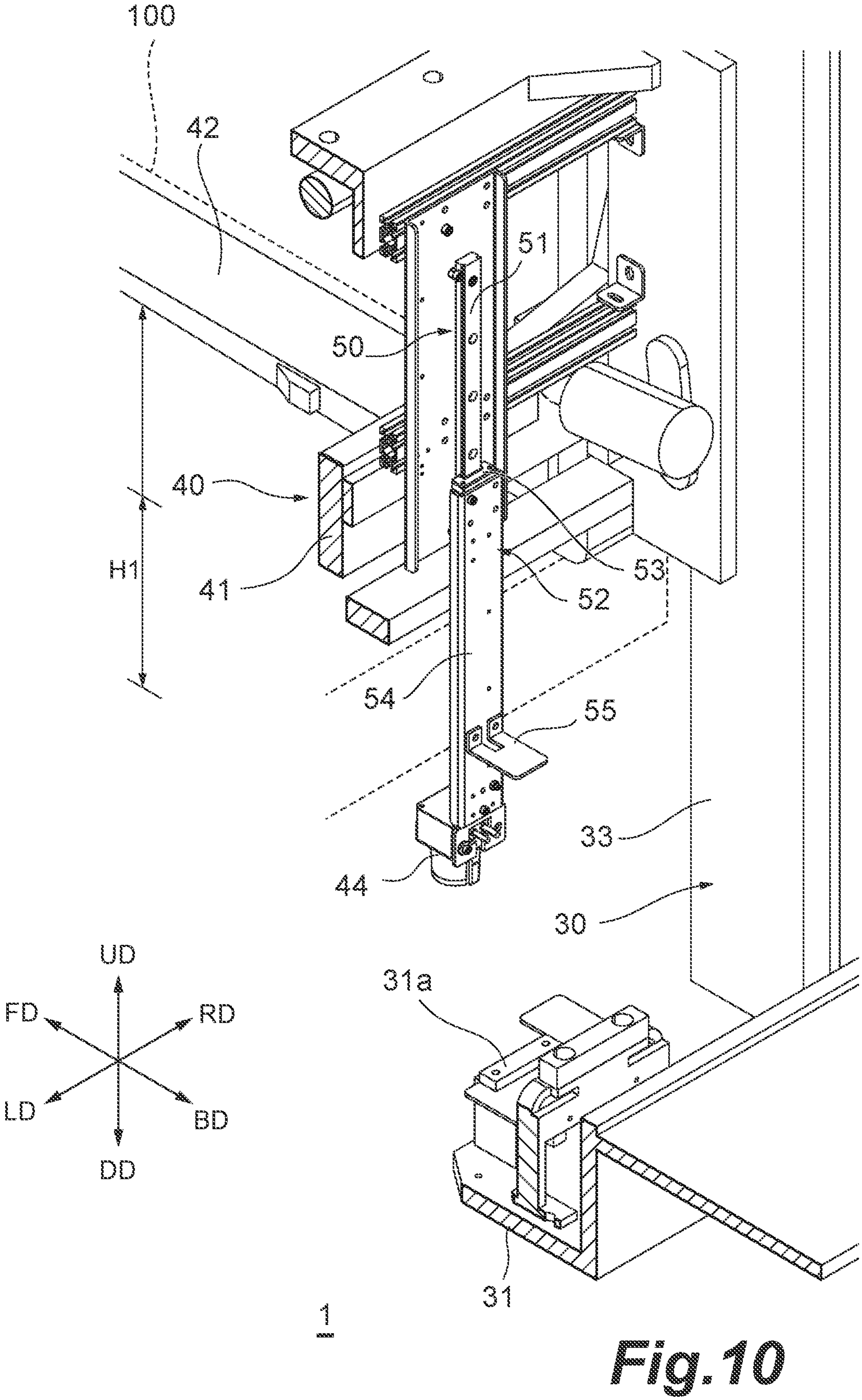
FIG. 10 is a partially cutaway enlarged perspective view of the forklift 1, illustrating a state where the fork 42 is placed at the height higher than the first height H1.

FIG. 9 is a partially cutaway side view of the forklift 1, illustrating a state where the forks 42 are placed at positions higher than the first height H1 from the floor surface F (second height range). FIG. 10 is a partially cutaway enlarged perspective view of the forklift 1, also illustrating a state where the forks 42 are placed at the height higher than the first height H1. As described above, when the forks 42 reach the first height H1, the relative movement of the guided member 52 relative to the guide member 51 is restricted, which prevents a relative positional relationship between the forks 42 and the distance sensor 44 (the guided member 52 and the movable piece 55) from changing. As a result, the upward movement of the forks 42, or the fork assembly 40, in the upward direction UD causes the movable piece 55 to be separated from the upper surface of the restriction piece 31*a* as illustrated in FIG. 9 and FIG. 10.

With the upward movement of the fork assembly 40, the guided member 52, or the distance sensor 44, moves upward in the upward direction UD along with the guide member 51 to the second height range. The relative movement of the guided member 52 relative to the guide member 51 is restricted as described above, which prevents the relative positional relationship between the forks 42 (i.e., the pallet 100) and the distance sensor 44 from changing. In other words, the distance sensor 44 remains at the measurement position. The distance sensor 44 can detect a distance to and a shape of an object, which may exist in the forward direction FD ahead of the forklift 1, at the measurement position lower than a lower surface of the pallet 100. This state is maintained during the movement of the forks 42 from the floor surface F to an uppermost position.

Meanwhile, a situation is assumed where the forks 42 move downward in the downward direction DD from the positions within the second height range toward the first height H. When the forks 42 move downward to reach the first height H1, the lower surface of the movable piece 55 is received on the upper surface of the restriction piece 31*a*. A downward movement of the guided member 52 is restricted. The distance sensor 44 is placed at the storage position. A further downward movement of the forks 42 causes the guided member 52 to be guided along the guide member 51. The guided member 52 relatively moves from the lowermost position toward the uppermost position relative to the guide member 51. The forks 42 relatively move in the height direction with respect to the distance sensor 44. The lower surfaces of the forks 42 come into contact with the floor surface F, which causes the downward movement of the forks 42 to terminate. The distance sensor 44 is thus positioned at the position in the upward direction UD above the upper surfaces of the forks 42.

Next, description will be made below on a situation where the forklift 1 moves the pallet 100, for example, from a position A to a position B within a warehouse. The forklift 1 moves in front of the pallet 100 placed at the position A with the forks 42 moved upward to a predetermined height from the floor surface F. Distal ends of the forks 42 facing the forward direction FD are placed in front of one of the side surfaces of the pallet 100 facing the forklift 1 at a distance of, for example, 20 to 30 cm. In this state, the fork assembly 40, or the forks 42, moves over a predetermined height range in the upward direction UD and the downward direction DD. The distance sensor 44 applies the laser beam L in the horizontal direction over the predetermined angular range at the storage position or the measurement position. As a result, distances to the insertion openings 104 of the pallet 100 placed in the forward direction FD and the shapes thereof are detected.

Specifically, in a case where, for example, the pallet 100 is placed directly on the floor surface F, the forks 42 move upward to, for example, a height exceeding the first height H1 from the floor surface F. At this time, the distance sensor 44 applies the laser beam L in the horizontal direction over the predetermined angular range at a plurality of heights. This causes the distances to the pair of insertion openings 104, 104 of the pallet 100 and the shapes thereof to be detected. The forklift 1 positions the distal ends of the forks 42, 42 at positions corresponding to the respective insertion openings 104, 104. Then, the mast assembly 30 and the fork assembly 40 move in the forward direction FD along the straddle legs 12, 12. This causes the forks 42, 42 to be inserted into the respective insertion openings 104, 104 of the pallet 100 until base ends of the forks 42, 42 are inserted.

Then, the forks 42 are lifted to a predetermined height in the upward direction UD. In the present embodiment, the forks 42 move to, for example, a second height range equal to or higher than the first height H1 and are held at the height. The distance sensor 44 is placed at the measurement position. The relative positional relationship between the fork 42 and the distance sensor 44 does not change. Further, the mast assembly 30 and the fork assembly 40 move in the backward direction BD to a predetermined position along the straddle legs 12, 12. In this state, the forklift 1 moves from the position A toward the position B within the warehouse on the basis of, for example, autonomous travel. In this example, the position B corresponds to, for example, a position on the conveyor. When arriving in front of the conveyor, the forklift 1 stops.

The distal ends of the forks 42 are placed in front of an end surface of the conveyor facing the forklift 1 at a distance of, for example, 20 to 30 cm. At this time, the forks 42 move over a height range including a height of an upper surface of the conveyor. At this time, the distance sensor 44 applies the laser beam L in the horizontal direction over the predetermined angular range at the plurality of heights. This causes a distance to the upper surface of the conveyor and a shape thereof to be detected. The forklift 1 lifts the pallet 100 held by the forks 42 in the upward direction UD to a height equal to or higher than the upper surface of the conveyor. Then, the forward movement and downward movement of the mast assembly 30 and the fork assembly 40 cause the pallet 100 to be placed on the upper surface of the conveyor. A work for moving the pallet 100 is thus completed.

In the forklift 1 as described above, with the forks 42 placed in a height range (a first height range) from the floor surface F to the first height H1, the movable piece 55 is received by the restriction piece 31*a*. The restriction mechanism 56 includes the movable piece 55 and the restriction piece 31*a* and the restriction mechanism 56 restricts the movement of the guided member 52 toward the downward direction DD. The distance sensor 44 is placed at the storage position. In the above example, the distance sensor 44 is placed at a predetermined height from the floor surface F. This makes it possible to reliably avoid contact of the distance sensor 44 with the floor surface F even when the forks 42 move downward to come into contact with the floor surface F. A damage to the distance sensor 44 can be prevented.

Meanwhile, with the forks 42 placed in a height range (the second height range) higher than the first height H1, the guided member 52 and the distance sensor 44 are held at the lowermost position with respect to the guide member 51 under their own weights. As a result, the distance sensor 44 is placed at the measurement position lower than the lower surface of the pallet 100 held by the forks 42. This makes it possible for the distance sensor 44 to detect an object in the forward direction FD ahead of the forklift 1 with the pallet 100 being held by the forks 42. For example, the distance sensor 44 can detect a distance to and a shape of an object (for example, a rack or a conveyor) at a position where the pallet 100 is to be unloaded. Therefore, the forklift 1 can recognize a state on the front side even when holding the pallet 100.

Moreover, in the forklift 1, the position of the distance sensor 44 is switched between the storage position and the measurement position by the guide member 51, the guided member 52, the movable piece 55, and the restriction piece 31*a* (i.e., the restriction mechanism 56). The guided member 52 is guided by the guide member 51 under the own weights of the distance sensor 44 and the guided member 52 and the movement of the movable piece 55 is restricted by the restriction piece 31*a*, thus achieving the switching of the position of the distance sensor 44. The implementation of such a mechanism requires none of electronic components such as a power source, a wiring line, and an actuator requiring an operation control. As a result, the switching of the position of the distance sensor 44 can be achieved at low cost.

In the forklift 1 as described above, the distance sensor 44 is indirectly guided by the guide member 51 via the holding member 54; however, the movement of the distance sensor 44 in the height direction may be directly guided by the guide member 51 merely via the carriage 53. In this case, it is only sufficient if the movable piece 55 is attached to the carriage 53 or the distance sensor 44. In addition, the restriction piece 31*a* may include, for example, an elastic material. By virtue of the elastic material, the contact of the movable piece 55 with the restriction piece 31*a* is elastically received with an impact of the contact between the movable piece 55 and the restriction piece 31*a* reduced. The transmission of the impact to the distance sensor 44 is also avoided.

It should be noted that regarding the first height H1 of the forks 42, it is necessary that in a case where the forks 42 hold the pallet 100, the laser beam L of the distance sensor 44 be below the lower surface of the pallet 100. Accordingly, the first height H1 is appropriately set in accordance with a thickness of the pallet 100 to be held by the forks 42. In the above-described embodiment, the first height H1 is set on the assumption that, for example, the pallet 100 has a thickness defined according to the JIS standards. However, in a case where, for example, the thickness of the pallet 100 is larger than the thickness according to the JIS standards, the first height H1 is set larger, accordingly. For example, a length of the guide member 51 or the holding member 54 is increased in accordance with an increase in the first height H1, if necessary.

In addition, in the above-described embodiment, a 2D LiDAR sensor is used as the distance sensor 44; however, for example, a stereo camera may be used as the distance sensor 44 by way of example of modification. The stereo camera is a distance sensor including, for example, a pair of cameras located right and left with a space in the horizontal direction in between. A distance to an object can be detected on the basis of a disparity generated by the pair of cameras located right and left. It should be noted that a wiring line for the distance sensor 44 is arranged from the distance sensor 44 to the bracket 41 of the fork assembly 40 through the holding member 54. For this arrangement, a so-called cable bear may be provided between the holding member 54 and the bracket 41.

In addition, for example, a gas spring may be used to set the movement range of the guided member 52 relative to the guide member 51. The gas spring is located in the height direction. For example, an upper end of a tube of the gas spring is fixed to the fork assembly 40 and a lower end of a rod supported within the tube and movable back and forth is fixed to the guided member 52. By virtue of such a configuration, the gas spring applies a load toward the downward direction DD and thus the guided member 52, or the distance sensor 44, is displaced toward the downward direction DD. It should be noted that the movement range of the guided member 52 only has to be set in accordance with an extension range of the gas spring.

Herein, some embodiments of the subject of the present disclosure are disclosed and examples are referred to for the purpose of enabling those skilled in the art to implement an embodiment of the subject of the present disclosure, the embodiment including manufacturing and use of a device or a system and performing an incorporated method. The patentable scope of the subject of the present disclosure is defined by claims and may include another example that would occur to those skilled in the art. Such an example is supposed to be within the scope of the claims, provided that it includes a component not different from the wordings in the claims or includes an equivalent component with an unsubstantial difference from the wordings in the claims.

The invention claimed is:

1. A forklift comprising:

a fork movable in a height direction;

a distance sensor held by the fork to be relatively movable with respect to the fork in the height direction, the distance sensor measuring a distance to an object existing in a forward direction;

a restriction mechanism restricting a movement of the distance sensor in a downward direction of the height direction when the fork is placed within a first height range from a floor surface to a first height, wherein the distance sensor is:

placed at a storage position spaced from the floor surface when restricted by the restriction mechanism; and placed at a measurement position lower than a lower surface of a pallet held by the fork when the fork is placed within a second height range equal to or higher than the first height; and a controller configured for object detection, fork alignment and autonomous navigation, wherein the controller:

receives a real-time scanned data from the distance sensor;

compares the real-time scanned data with a prestored data to obtain a comparison;

determines, a shape of the object and distance to the object based on the comparison, alignment of the fork in insertion openings, and an environment and a self-location for autonomous navigation of the forklift.

2. The forklift according to claim 1, wherein the restriction mechanism includes:

a movable piece movable in the height direction along with the distance sensor; and a restriction piece located on a movement path of the movable piece, the restriction piece receiving the movable piece to restrict a movement of the movable piece when the fork is placed within the first height range.

3. The forklift according to claim 1, wherein a relative movement between the fork and the distance sensor is caused when the fork is within the first height range.

4. The forklift according to claim 3, wherein the relative movement is caused by at least an own weight of the distance sensor.

5. The forklift according to claim 2, further comprising a guide mechanism held by the fork, the guide mechanism guiding the movement of the distance sensor in the height direction within a preset height range.

6. The forklift according to claim 5, wherein the guide mechanism includes:

a guide member held by the fork; and a guided member being guided by the guide member to be movable in the height direction within a preset height range, the guided member holding the distance sensor and the movable piece.

7. The forklift according to claim 6, wherein when the fork is placed within the second height range, the guided member and the distance sensor are placed at a lowermost position with respect to the guide member under own weights of the guided member and the distance sensor.

8. The forklift according to claim 7, wherein when the fork is placed within the second height range, a relative positional relationship between the fork and the distance sensor does not change.

9. The forklift according to claim 5, wherein the guide member includes a linear guide.

10. The forklift according to claim 1, wherein the distance sensor is configured to measure the distance to the object in the forward direction at both the storage position and the measurement position.

11. The forklift according to claim 2, wherein the restriction piece includes an elastic material.

12. The forklift according to claim 1, wherein the first height is set in accordance with a thickness of the pallet.

13. The forklift according to claim 1, wherein the forklift comprises a bracket configured to be movable in the height direction with respect to an inner mast.

14. The forklift according to claim 1, wherein the fork is attached to a front surface of a bracket.

15. The forklift according to claim 1, wherein the distance sensor is attached to a rear surface of a bracket.

16. The forklift according to claim 15, wherein the distance sensor is located at a center of the forklift in the right-and-left directions.

17. The forklift according to claim 1, wherein a backrest is attached to an upper end of a bracket and being configured to prevent a load on the pallet lifted by the forks from falling behind a fork assembly.

18. The forklift according to claim 5, wherein the guide mechanism is fixed to the rear surface of a bracket.

19. The forklift according to claim 6, wherein the guided member includes a carriage being slidably supported by the guide member and a holding member being attached to the carriage and configured to hold the distance sensor.

20. The forklift according to claim 1, wherein the controller is configured to control the fork to:

move to a height exceeding the first height, and cause the distance sensor to apply a laser beam in a horizontal direction over a predetermined angular range at a plurality of heights, causing distances to a pair of insertion openings of the pallet and shapes thereof to be detected;

positions distal ends of the fork at positions corresponding to the respective pair of insertion openings of the pallet and insert the fork until base ends are inserted thereof;

lift the pallet in an upward direction to the second height equal to or higher than the first height and are held at the height;

move to a height of an upper surface of a conveyor, and cause the distance sensor to apply the laser beam in the horizontal direction over the predetermined angular range at the plurality of heights, causing a distance to the upper surface of the conveyor and a shape to be detected thereof;

lifts the pallet in the upward direction to the height equal to or higher than the upper surface of the conveyor and;

place the pallet on the conveyor by forward and downward movement of the fork.

* * * * *